May 10, 1955  J. L. REYNOLDS  2,707,820
METHOD FOR MAKING TUBULAR ELEMENTS
Filed Oct. 11, 1950  5 Sheets-Sheet 1
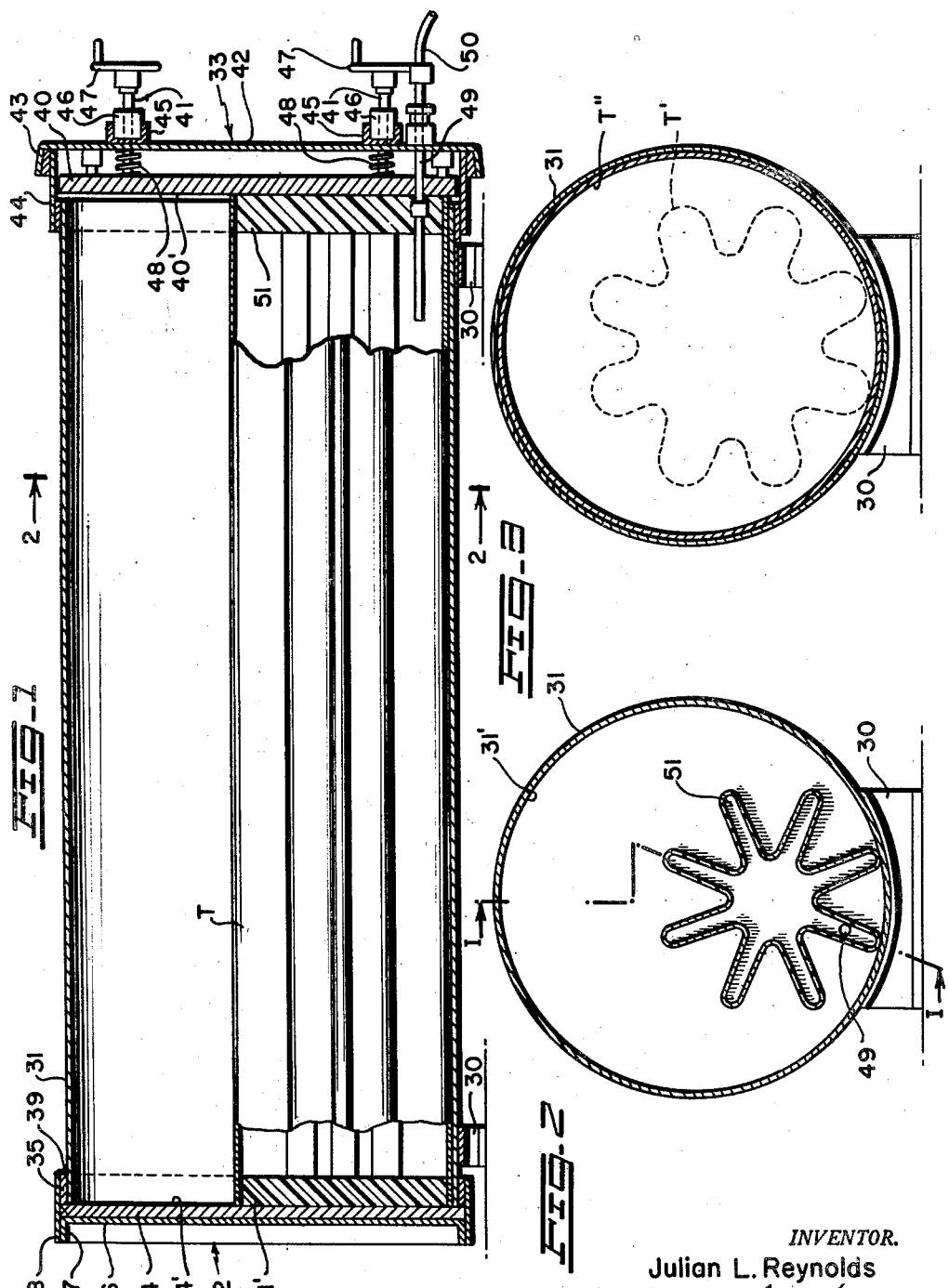
INVENTOR.
Julian L. Reynolds
BY
ATTORNEY.

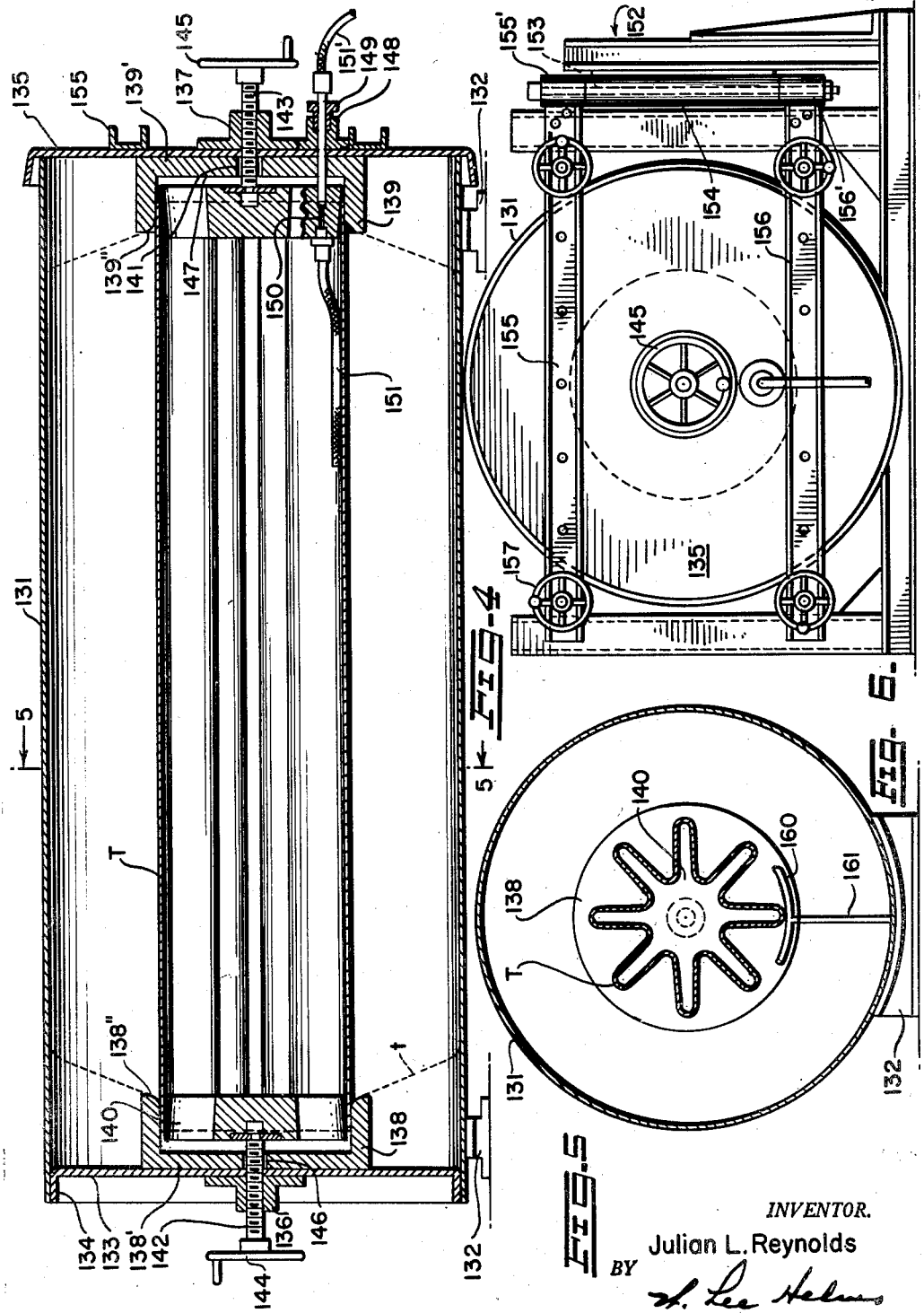

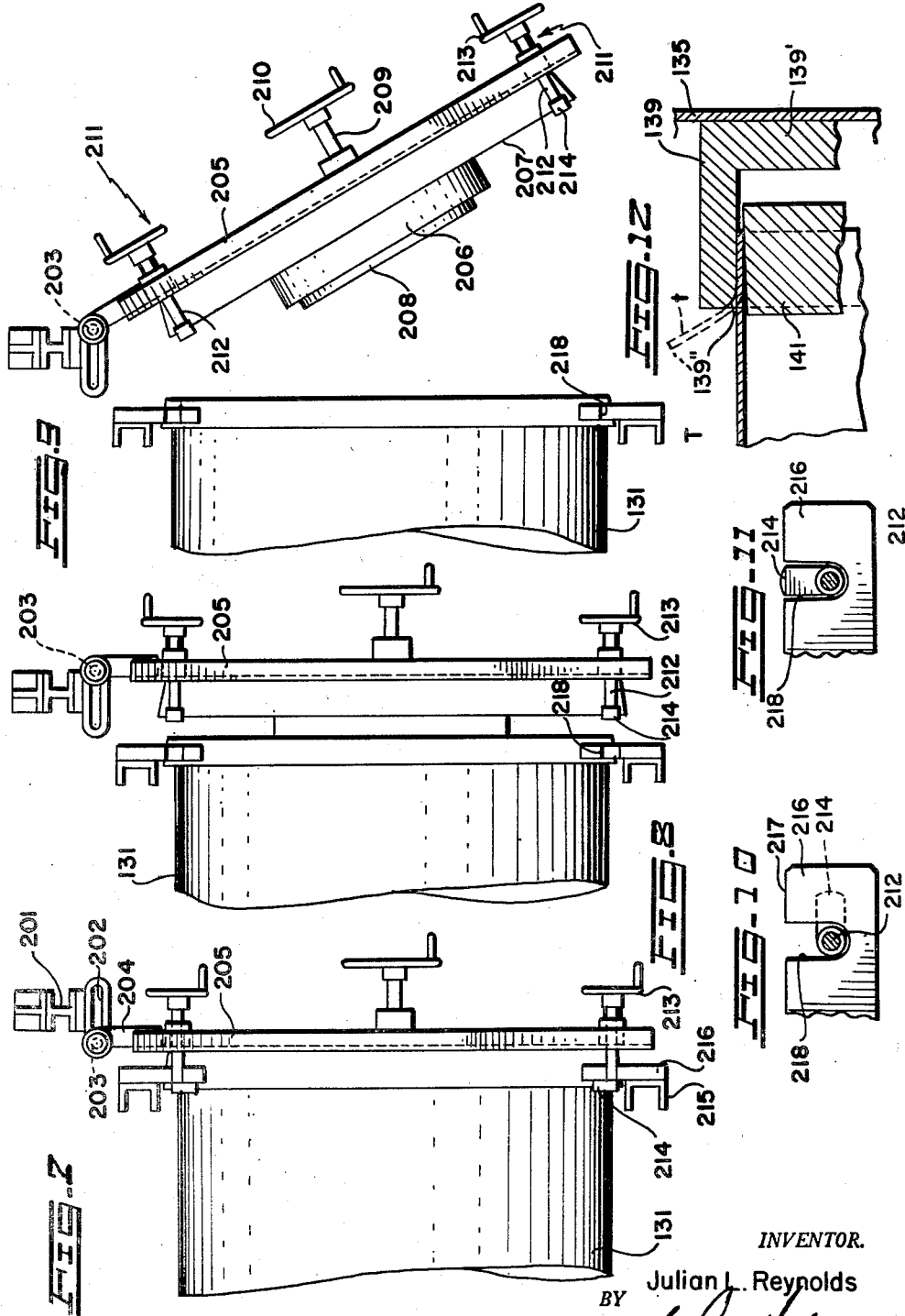

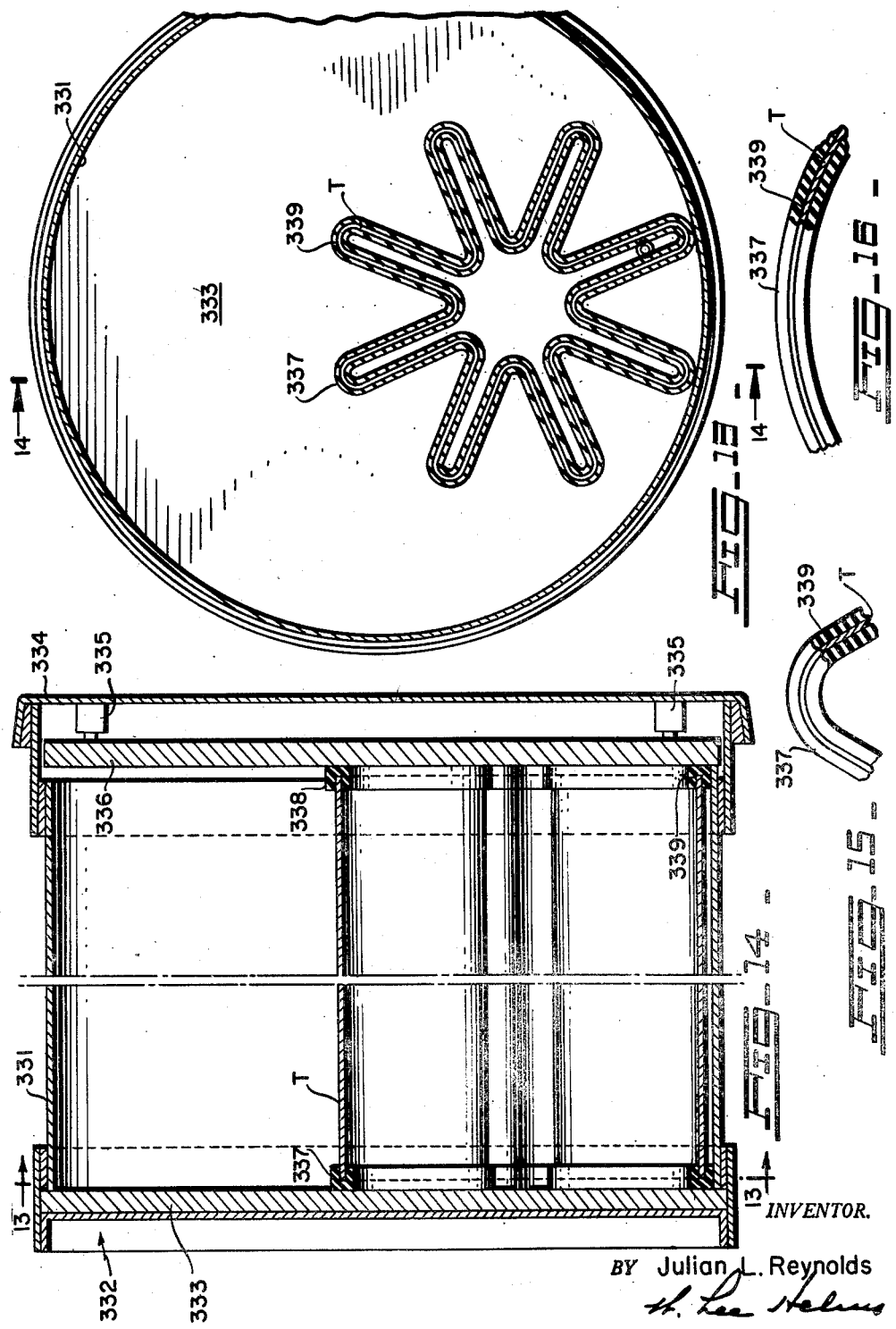

May 10, 1955 J. L. REYNOLDS 2,707,820
METHOD FOR MAKING TUBULAR ELEMENTS
Filed Oct. 11, 1950 5 Sheets-Sheet 5
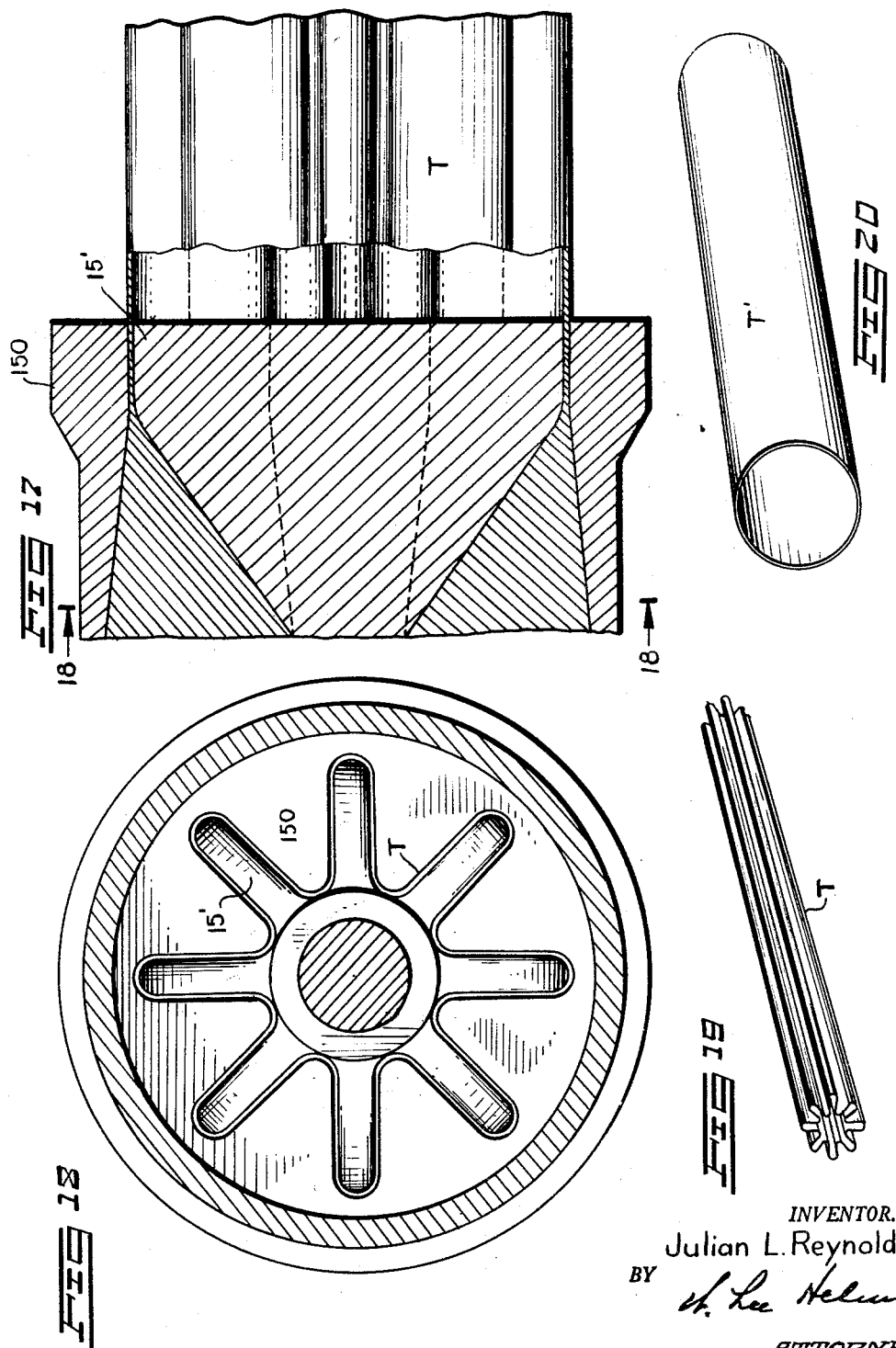
INVENTOR.
Julian L. Reynolds
BY
ATTORNEY.

United States Patent Office 2,707,820
Patented May 10, 1955

2,707,820

METHOD FOR MAKING TUBULAR ELEMENTS

Julian L. Reynolds, Richmond, Va.

Application October 11, 1950, Serial No. 189,515

4 Claims. (Cl. 29—421)

This invention relates to a method for making tubular elements, and more particularly, to the fabrication of metal tanks by first extruding corrugated tubes having a relatively small diameter and then introducing high pressure fluid into the interiors of said corrugated tubes so as to expand them radially into a cylindrical form having a relatively large diameter.

The present invention is particularly advantageous in the manufacture of large-diameter tubular elements by extrusion processes. In conventional methods of extruding metal objects, heated metal, but solid, is forced through the opening of an extrusion die. It will be obvious that the die must have a larger diameter than that of the object which is to be extruded. Although conventional extrusion processes are satisfactory for extruding tubular elements of relatively small diameter, considerable disadvantages arise in the extrusion of very large-diameter tubular elements, the most important disadvantage being the enormous size of the required press and the extrusion die.

Although the present invention is particularly useful when employed in the fabrication of tubular elements having a large diameter, it is to be understood that the fabrication of smaller-diameter tubular and other hollow members may be advantageously provided by the method and apparatus of the subject invention.

It is a primary object of the present invention to provide a method for making tubular elements, tanks or other hollow members, wherein a tube having a corrugated wall and open opposite ends is sealed and then a fluid under pressure is introduced into the interior of the corrugated tube so as to expand the latter radially into a cylindrical non-corrugated form of larger diameter.

One object is to provide novel methods for sealing the opposite ends of the corrugated tube. In one form of the invention the opposite open ends of the corrugated tube are sealed by placing flat plates against the tube ends after inserting a body of yielding material, such, for example, as plastic into the ends and in sealing contact with the interior wall surface of the tube ends and the flat abutting surfaces of the plates. As the tube is expanded by the internal pressure, the tube ends are free to expand radially outwardly while sliding against and maintaining sealing contact with the flat plate surfaces, the mass of plastic material simultaneously expanding with the tube ends and reducing in thickness so as to aid in maintaining the sealing contact.

In a second form of the invention a rigid core conforming with the interior of the extruded corrugated body is placed within each of its ends and a corrugated sleeve extends around the latter so as to press the tube wall material into tight sealing abutting contact with the core.

Still another form of the invention resides in the use of a flexible sealing strip which is mounted around and adjacent the edge of the tube wall at each end of the tube. The sealing strip conforms to the shape of the tube edge and maintains a sealed relation between the latter and the adjacent bearing surface against which the tube end abuts. The strip is flexible and expands radially outwardly along with the expanding tube so as to maintain the sealing contact.

Another object of the invention is to provide an outer forming chamber having a cylindrical interior die surface against which the expanding tube abuts so as to be formed into a symmetrical cylindrical form upon the completion of its expansion by the high pressure fluid introduced therein.

A further object of the invention is to provide closure means for the hollow cylindrical forming chamber so as to completely enclose the corrugated tube during the expansion step. This enables the temperature and condition of the air within the die and in contact with the tube to be sealed off from the atmosphere and easily controlled.

Still another object of the invention is to provide a novel mounting means for the closure members of the cylindrical forming chamber whereby the closure members may be quickly and easily actuated for opening and closing movements.

It is to be understood that the particular embodiments of the invention as shown in the drawings and described in the specification are intended to be merely illustrative of several of the many forms which the invention may take in practice and are not to limit the scope of the invention. The latter is delineated in the appended claims.

Other advantages of the present invention are inherent in the apparatus structure and in the method steps as claimed and as disclosed in the specification and in the drawings wherein:

Fig. 1 is a longitudinal sectional view through the apparatus showing one form of the invention, the corrugated tube being shown within the cylindrical chamber or die with the tube ends in sealing contact with the flat surfaces of the plates;

Fig. 2 is a transverse vertical sectional view taken on the line 2—2 of Fig. 1;

Fig. 3 is a transverse vertical sectional view similar to Fig. 2 and showing the corrugated tube in its partly expanded condition by dotted lines and in its completely expanded condition by solid lines and sectional hatching;

Fig. 4 is a longitudinal sectional view of a modified form of the apparatus;

Fig. 5 is a transverse sectional view taken on the line 5—5 of Fig. 4;

Fig. 6 is an end elevational view as seen from the right in Fig. 4;

Fig. 7 is a side elevational view showing a modified form of a closure member adapted to be secured to one of the open ends of the hollow cylindrical die member, the closure member being shown in its closed secured position;

Fig. 8 shows the closure member of Fig. 7 unlocked and moved longitudinally outwardly from the end of the cylindrical die member;

Fig. 9 shows the closure member of Figs. 7 and 8 pivoted outwardly and upwardly away from the respective end of the cylindrical die member;

Fig. 10 is a detail view of a locking means for securing the closure member in closed assembled position on the respective end of the cylindrical die member, the locking means being shown in locked position;

Fig. 11 is a detailed view showing the locking means of Fig. 10 in its unlocked position;

Fig. 12 is a detail sectional view showing the wall of the corrugated tube compressed in sealed relation between the sleeve and the rigid core, the latter projecting within the open end of the tube;

Fig. 13 is a transverse vertical sectional view of an apparatus embodying still another modified form of the invention wherein continuous flexible sealing strips are mounted on the respective ends of the tube;

Fig. 14 is a longitudinal vertical sectional view taken on the line 14—14 of Fig. 13;

Fig. 15 is an enlarged sectional detail view of a portion of the sealing strip and end of the tube therein, the strip and tube being shown in the sinuous or corrugated configuration as they appear before expansion;

Fig. 16 is a view similar to Fig. 15, but showing the strip and tube after expansion into the final cylindrical form;

Fig. 17 is a schematic view in partial longitudinal section showing an extrusion die ring with its associated core and indicating a flow of metal from a billet (not shown) to form a hollow extrusion with folds or corrugations as shown in the greatly reduced view in Fig. 19;

Fig. 18 is a vertical section on the line 18—18 Fig. 18;

Fig. 19 is a greatly reduced isometric view of the extrusion; and

Fig. 20 is an isometric view of the expanded tank body formed from the extrusion.

Referring first to Figs. 1 to 3 inclusive, wherein is shown a preferred form of the invention, the reference numeral 31 indicates generally a longitudinal hollow cylindrical chamber or die member. A pair of suitable supporting brackets 30 are secured to the lower portion of the cylindrical chamber or die member 31 and are adapted to rest upon the floor so as to support die member 31 in horizontal position. At the left hand end of the cylindrical chamber or die member 31 there is fixedly mounted a substantially circular closure member indicated generally at 32. Similarly, a closure member 33 is removably mounted on the right hand end of the cylindrical chamber or die member 31.

Closure member 32 comprises a substantially circular flat plate 34 having a smooth planar inner surface 34'. The outer periphery of the plate 34 is provided with an inwardly extending flange 35 mounted on the exterior surface of the cylindrical chamber or die member 31. A circular brace member 36 abuts against the exterior surface of the plate 34 and is provided around its periphery with an integral outwardly extending flange 37. A sleeve 38 is mounted around peripheral flanges 35, 37 and is secured thereto so that plate 34 and brace member 36 may be held together in rigid reinforced relation. Closure member 32 is fixedly secured to its respective end of the cylindrical chamber or die member 31 as by welding at 39 or by press fitting the circular flange 35 on to the exterior surface of the cylindrical chamber or die member 31.

Closure member 33 comprises a flat circular bearing plate 40 having a smooth planar inner bearing surface 40'. A plurality of shafts 41 are rotatably mounted to the bearing plate 40 at their inner ends and extend outwardly through suitable apertures (not shown) provided in an outer circular cover member 42. The latter is provided round its periphery with an integral inwardly extending flange 43 surrounding and removably mounted on a sleeve 44 which in turn surrounds and is fixedly secured to the right hand end of the cylindrical chamber 31. A plurality of bracket members 45 are secured to the cover member 42 and each has mounted therein an internally threaded member 46. The shafts 41 extend through the internally threaded member 46 and are provided with an exterior thread in engagement therewith. The outer ends of the shafts 41 are each provided with a suitable manual rotating means such as hand wheels 47.

It will be noted that the bearing plate 40 is mounted on the inner ends of the shafts 41 by any suitable means so as to be free to undergo a limited reciprocal movement inwardly and outwardly relative to the shafts 41 and along the direction of the axis of the cylindrical chamber 31. A coil spring 48 surrounds each of the shafts 41 and abuts the interior surface of the cover plate 42 and also the exterior surface of the bearing plate 40. The springs 48 are under compression so as to resiliently bias the bearing plate 40 inwardly, for a purpose to be described below. It will thus be obvious that by rotating the hand wheels 47, the shafts 41 will engage the internally threaded members 46 so as to be moved in an axial direction, thereby moving the bearing plate 40 inwardly or outwardly in a direction along the axis of the cylindrical chamber 31. A rigid pipe 49 extends through aligned apertures in the bearing plate 40 and cover member 42 and is connected at its outer end to a flexible hose 50 leading to a supply source of fluid under high pressure (not shown).

In fabricating a tubular element in accordance with the preferred form of the present invention, the first step involves the extrusion of a fluted tube T having a corrugated wall configuration. More especially, the tube T is extruded so as to have longitudinal flutes or corrugations extending throughout its length. The tube T is also provided with open opposite ends.

In Figs. 17 and 18 I have schematically shown an extrusion die ring 150 with its coacting die core 151 which elements will be mounted in a suitable extrusion press. Metal 152 from a billet, the latter not being shown, will flow between the die members to form an extrusion as shown in Fig. 19, in greatly reduced form. The tank body or other article to be expounded therefrom is shown in Fig. 20. It is preferred that the extrusion be subjected to that annealing heat suitable for the particular metal employed, as for example aluminum or magnesium or alloys thereof, prior to the expansion step, and that the expansion be applied to the extrusion in its heated state, which may be the annealing temperature, or more or less.

After the corrugated tube T has been extruded, it is preferably heated to a suitable hot-working temperature in preparation for the expansion step. However, this heating may be eliminated and the tube may be expanded cold, if desired. Each of the opposite open ends of the tube T is then filled with a mass of plastic material, as shown at 51, 51' in Fig. 1.

The plastic material should be of a type which will withstand sustained high temperatures without change in its chemical structure and without reacting with the metal of the tube T. Furthermore, the plastic material should be of a type having a suitable plasticity or fluidity at the operating temperatures of the high pressure fluid and the tube T during the expansion step.

For example, a preferred type of such plastic material is polytetrafluorethylene, manufactured by E. I. Du Pont and known by the trade name of "Teflon." Another suitable plastic material for sealing up the ends of the tube T is polychlorfluorethylene manufactured by the Kellogg Corporation and known by the trade name "Kellon." Still another of such materials is organic elastomeric silicone known to the trade as "Siliastic" and manufactured by The Dow-Corning Company and General Electric Company and others. Polychlor-fluorethylene will successfully withstand temperatures of upwards of 400° F. to 500° F. for limited periods of time, whereas organic elastomeric silicone will withstand sustained temperatures of up to 700° F. when directly exposed to air and considerably higher temperatures when placed in a confined atmosphere. However, where the operating temperatures are limited to approximately 350° F. for extended periods of time, and to 450° F. for limited periods of time, elastomeric polysulfide, known to the trade as "Thiokol" and manufactured by the Thiokol Corporation, may be employed as the plastic material. For lower temperature ranges up to 250° F., any number of substances are available such as natural rubber and synthetic rubbers, including polyisobutylene, styrene-butadiene, acrylonitrilebutadiene, plasticized polyvinyl chloride and compositions comprising mixtures of these materials.

The removable closure member 33 is then removed from the right-hand end of the cylindrical die member 31 and the corrugated tube T is placed within the latter in the manner shown in Figs. 1 and 2, the tube T resting upon the lower interior surface of the chamber or die member 31 and the left-hand end of the tube T abutting against the interior planar bearing surface 34' of the fixed bearing plate 34. The closure member 33 is then assembled on to the right-hand end of the member 31. As the closure member 33 is being moved toward the closed position, the inner end of the rigid pipe 49 pierces and extends through the plastic mass 51 which fills up the right-hand end of the tube T. The hand wheels 47 are then rotated so as to move the interior planar bearing surface 40' of the bearing plate 40 into abutting contact with the right-hand end of the tube T. The springs 48 resiliently bias the bearing plate 40 inwardly toward the other bearing plate 34 so as to compress the tube T therebetween and thus maintain the opposite opened ends of the tube T in substantially sealed contact with the respective bearing planar surfaces 34', 40'.

The interior of the tube T is then filled with a suitable fluid under high pressure, the latter being introduced therein through the hose 50 and pipe 49. It should be understood that the term "fluid" as used throughout the specification and claims is intended to include such fluid mediums as steam, compressed air, water and the like, and includes fluids both in a gaseous and liquid state. The high pressure fluid within the interior of the tube T will serve to cause the latter to expand radially outwardly as shown by the dotted lines at T' in Fig. 3, the corrugations or flutes of the tube unfolding during the expansion whereby the tube approaches a cylindrical non-corrugated form. As the tube T continues to expand, it will contact the cylindrical interior surface 31' of the cylindrical chamber 31, whereby the die surface 31' will serve to form the expanding tube into a uniform symmetrical cylindrical shape, as shown at T" in Fig. 3.

The closure member 33 is then removed and the completely expanded cylindrical tube T" may be withdrawn from the cylindrical die member 31.

During the expansion of the tube, the masses of plastic material 50, 51 within the open ends of the tube also expand and are maintained by the internal pressure in sealing contact with the planar bearing surfaces 34', 40' and also the interior wall surfaces of the tube T adjacent thereto, thereby cooperating with the bearing plates 34, 40 so as to maintain the opposite ends of the tube sealed and so as to allow a high fluid pressure to be built up within the interior of the tube.

It will thus be seen that the expanded tube T" is provided with a relatively large diameter notwithstanding the fact that in the extrusion process extruding dies of a much smaller diameter were employed.

Referring now to Figs. 4 to 6 inclusive, wherein is shown a modified form of the invention, the reference numeral 131 designates a cylindrical chamber or die member (similar to cylindrical member 31) and provided with supporting means 132 adapted to rest upon the floor and support the cylindrical die member 131 in a horizontal position. A circular closure member 133 has around its periphery an integral annular flange portion 134 press-fitted within or otherwise fixedly secured to the left-hand open end of the cylindrical die member 131.

The right-hand end of cylindrical member 131 is provided with a removable closure member 135. A pair of internally-threaded hubs or collar members 136, 137 are each secured respectively to closure members 133, 135 at the exterior surfaces of the latter. Each of the interior surfaces of closure members 133, 135 have secured thereto a sleeve 138, 139, respectively. A core 140, 141 is adapted to extend within each of the sleeves 138, 139 and has rotatably secured thereto the inner end of an externally threaded shaft 142, 143 respectively. The shafts 142, 143 extend outwardly from their rotatable connections with cores 140, 141 and extend through apertures 146, 147 provided in the wall portions 138', 139' of the sleeves 138, 139. Apertures are also provided in the closure members 133, 135, these latter apertures and apertures 146, 147 and also the internally threaded openings in the hubs or collar members 136, 137 being in axial alignment so as to enable the shafts 142, 143 to extend therethrough. The outer ends of the threaded shafts 142, 143 are provided with hand wheels 144, 145.

As best seen in Fig. 5, the exterior surface of the core 140 is provided with a corrugated or fluted configuration corresponding to the shape of the tube T, whereby when the core 140 is inserted within a respective open end of the latter, the corrugated exterior surface of the core 140 may be in sealing contact with the adjacent interior surface of the tube T. Similarly, the interior surface of the sleeve 138 is corrugated or fluted so as to be in sealing contact with the adjacent exterior surface of the corrugated tube T. As shown in Figs. 4 and 12, the exterior surface of the core 140 and the interior surface of the sleeve 138 compress the tube wall therebetween so as to be in tight sealing contact therewith. The exterior surface of the core 138 is tapered inwardly so as to facilitate the insertion of the core 138 into the respective end of the tube T.

It will be understood that the core 141 and sleeve 139 at the opposite end of the cylindrical die member 131 are similarly of a corrugated or fluted configuration. Also, the shaft 143 extends through aligned apertures in portion 139', closure member 135 and hub or collar member 137, the threaded aperture of the latter being in threaded engagement with the exterior threads of the shaft 143. A rigid pipe 148 is mounted on the closure member 135 by suitable coupling means 149 and extends inwardly through the closure member 135 and the portion 139' of the sleeve 139, the inner end of the pipe 148 being in communication with a channel 150 extending through the core 141 and communicating with a length of flexible hose 151 adapted to be placed with the interior of the corrugated tube T. The outer end of the rigid pipe 148 communicates with a flexible hose 151' which is connected to a supply source of high pressure fluid (not shown).

As shown in Fig. 6, a frame indicated generally at 152 is located adjacent the right-hand end of the cylindrical die member 131 and comprises a vertical pivot bolt 153 extending through a fixed hinge member 154. A pair of horizontal channel members 155, 156 are secured to the closure member 135 and are each provided at one end with a movable hinge member 155', 156' pivotally mounted with respect to the fixed hinge member 154 on the pivot bolt 153. It will thus be seen that closure member 135 is mounted for pivotal movement about the axis of the pivot bolt 153 so as to be hingedly movable toward open and closed positions with respect to the right-hand end of the cylindrical die member 131. Suitable locking means (not shown) may be actuated by hand wheels 157 so as to maintain closure member 135 in locked closed position on the cylindrical die member 131.

As shown in Fig. 5, the lower portion of the cylindrical die member 131 is provided with an arcuate segment 160 secured to a vertical supporting member 161 adapted to be elevated or lowered by any well-known mechanism. In the upper position shown in Fig. 5, the segment 160 acts as a platform for supporting the tube T as the latter is initially inserted into the interior of the cylindrical die member 131. After the opposite ends of the tube T are secured to the cores 140, 141 and sleeves 138, 139, the segment 160 is lowered so as to be continuous with the remaining portion of the cylindrical die member 131.

In fabricating tubular elements in accordance with the second form of the invention, a corrugated tube T is first made by means of a conventional extrusion process in the same manner as described above with respect to the first or preferred form of the invention. The corrugated tube T is then placed within the interior of the cylindrical die member 131 and rests upon the arcuate section 160, the latter being temporarily in its elevated position shown in Fig. 5. The tube T is preferably slidably moved on the platform segment 160 in a direction axially of the cylindrical die member 131, the left-hand end of the tube T entering the interior of the sleeve 138. The closure member 135 is then swung about the hinge means 153, 154 so as to close the right hand end of the cylindrical die member 131 and thereby cause the sleeve 139 to surround the right-hand end of the tube T.

The cores 140, 141, which were initially in an outward position adjacent the portions 138', 139' of the sleeves 138, 139, are then moved inwardly towards each other by rotating the hand wheels 144, 145. As the cores 140, 141 are thus moved, they enter the respective open ends of the tube T, the adjacent wall portions of the latter being compressed between the corrugated exterior surfaces of the cores 140, 141 and the corrugated interior surfaces of the sleeves 138, 139, thereby maintaining the opposite ends of the tube T tightly sealed. Fluid under high pressure is then introduced into the interior of the tube T by means of hose 151', pipe 148, channel 150 and hose 151, so as to expand the tube T radially outwardly to the position shown by dotted lines at t in Fig. 4.

It will be noted that the inner annular edges 138", 139" of the sleeves 138, 139 are rounded so as to prevent sharp bends in the wall portions of the expanded tube t adjacent thereto. As the tube continues to expand, its wall portion contacts the interior cylindrical surface of the cylindrical die member 131, so as to be formed into a symmetrical cylindrical shape. The expanded tube t is then removed from the cylindrical member 131 and its opposite tapered ends may be cut off, resulting in a symmetrical cylindrical tube having a relatively large diameter notwithstanding the relatively small diameter of the extrusion dies.

Referring now to Figs. 7 to 12 inclusive, there is disclosed a modified arrangement for mounting the closure members adapted to be secured to the opposite open ends of the hollow cylindrical air member 131. Adjacent each end of the latter there is provided a stationary bracket 201 which has at its lower end a horizontally extending longitudinal slot 202. A roller 203 extends within the slot 202 and is rotatably mounted to a bracket 204 which is in turn fixed to the upper peripheral edge of the closure member 205. It will thus be seen that the roller 203 may reciprocate horizontally within the slot 202 so as to enable the closure member 205 to be moved laterally toward the left and into engagement with the respective end of the cylindrical die member 131 as shown in Fig. 7 of laterally outwardly of the die member 131 and toward the right as viewed in Fig. 8. Also, as shown in Fig. 9, the closure member 205 may be pivoted upwardly and outwardly about the axis of the pin 203 as shown in Fig. 9, thereby enabling the respective end of the die member 131 to be unobstructed so as to permit the insertion or removal of the tube.

The sleeve 206, similar to the sleeves 138, 139 above described, is fixed to the inner surface 207 of the closure member 205. Also, a core 208 is movably mounted within the sleeve 206, by means of a threaded shaft 209 and hand wheel 210, as described above with respect to cores 140, 141, threaded shafts 142, 143 and hand wheels 144, 145.

A plurality of locking means, indicated generally by the reference numeral 211, are mounted at various points adjacent the periphery of the closure member 205. Each of the locking means 211 comprises a shaft 212 extending through the closure member 205 and rotatably mounted therein. At the outer end of the shaft 212 there is secured a hand wheel 213 for rotating the latter and the inner end of the shaft is provided with a locking detent 214 extending laterally and radially outwardly therefrom.

Suitable fixed brackets 215 are provided adjacent the respective opened end of the cylindrical die member 131, each of the brackets 215 supporting a vertical plate 216 having extending from its upper edge 217 a vertical slot 218. Each of the shafts 212 is adapted to extend through a respective slot 218 so as to enable the locking detent 214 to cooperate with the plate 216 in a manner to be described below.

After the tube has been placed within the interior of the die member 131, the closure member 205 is pivoted downwardly and inwardly about the pivot pin 203 from the position shown in Fig. 9 to the vertical position shown in Fig. 8. It will be obvious that the shafts 212 are in alignment with the respective slots 218 in the plate 216, the hand wheels 213 being turned so that the locking detents 214 extend parallel to the slots 218 as shown in Figs. 8 and 11. The closure member 205 is then moved laterally inwardly toward the end of the die member 131 or to the left as shown in Figs. 7 and 8. This movement is accomplished by the rolling movement of the pin 203 within the slot 202. As the closure 205 is thus moved, the detents 214 and shafts 212 project through the respective slots 218 as shown in Fig. 11. The hand wheels 213 are then rotated so as to cause the detents 214 to extend transversely to the slots 218 as shown in Fig. 10 thereby locking the closure member 205 to the end of the cylindrical die member 131. When the closure member 205 is to be removed the hand wheels 213 are rotated so as to cause the locking detents 214 to extend parallel to the slots 218 as shown in Fig. 11, thereby enabling the shafts 212 and locking detents 214 to be withdrawn through and from the slots 218. Referring now to Figs. 13 and 16, inclusive, there is disclosed still another modified form of the invention employing a flexible sealing strip or gasket for sealing up the opposite open ends of the tube T during the expansion step. The cylindrical die member 331 is provided at its left hand end with a closure member 332 fixed thereto and having at its inner surface a bearing plate 333. At the opposite end of the die member 331 there is provided a removable closure member 334 having suitable spring means 335 for mounting a bearing plate 336 and for biasing the latter inwardly toward the opposite bearing plate 333.

A pair of flexible sealing strips 337, 338 are each mounted at the opposite open ends of the tube T. The strips 337, 338 may be formed of rubber, plastic or any other suitable material which is resilient and capable of withstanding the operating temperatures within the die member 331. Each of the strips 337, 338 is continuous as shown in Fig. 13 and preferably of a rectangular cross-section as shown in Fig. 14. The inner lateral faces of the strips 337, 338 are each provided with a continuous channel or groove 339 adapted to receive the edge of the respective end of the tube T. The faces of the strips 337, 338 opposite the channeled faces are flat so that they may abut against the respective bearing surfaces of the bearing plates 333, 336 in sealing contact therewith.

In employing the last described form of apparatus in practicing the present invention, the sealing strips 337, 338 are first mounted on the respective opposite ends of the tube T after the latter has been extended in corrugated or fluted form. The tube T is then placed within the cylindrical die member 331, the sealing strip 337 abutting against the bearing plate 333 in sealing contact therewith and the bearing strip 338 abutting against the sealing plate 336 and likewise sealing the right hand end of the tube T. The spring mounting means 335 on the removable closure member 334 will bias or urge the bearing plate 336 to the left as viewed in Fig. 14, thereby maintaining the sealing strips 337, 338 in tight-pressed sealing relation to the respective flat surfaces of the bearing plates 333, 336.

When fluid under high pressure is introduced into the interior of the corrugated tube T the latter will expand into cylindrical form in the same manner described above with respect to the previous modified forms of the invention. As the tube T expands, the sealing strips 337, 338 will also "expand," that is, they will conform to the configuration of the tube ends as the latter expands and will approach and eventually attain a circular configuration as shown in Fig. 16 when the tube has become fully expanded and is cylindrical. The removable closure member 334 may then be dismounted and the fully expanded cylindrical tube may be removed from the cylindrical die member 331. The sealing strips 337, 338 are then removed from the opposite ends of the tube and may be reused with the next corrugated tube which is to be expanded.

It will thus be seen that the present invention provides a highly advantageous and effective method and apparatus for making tubular elements, tanks or other hollow members, wherein a tube having a corrugated wall and open opposite ends is sealed and the fluid under pressure is introduced into the interior of the corrugated tube so as to expand the latter radially into a cylindrical form of larger-diameter.

What I claim and desire to secure by Letters Patent is as follows:

1. A method of expanding elongated corrugated metal tubes into cylindrical metal tubes of greater diameter but with the same external area as said corrugated tubes comprising the step of extruding a hollow metallic body having longitudinal flutes extending throughout its length and having opposite opened ends, the flutes being hollow and the flute walls being rounded at their outer ends and at the inner ends joining each flute to an adjacent flute, the flutes being radial with respect to a central axis and the outer ends of the flutes meeting a cylindrical line, the length of the flutes being greater than one-third the distance between said peripheral line and the axis of the extruded body, the step of annealing said extruded body, the step of inserting said corrugated tube into a cylindrical die, sealing the open ends of said corrugated tube while permitting expansion of the tube relatively to the sealing media, and applying high pressure fluid interiorly of said sealed corrugated tube to expand said tube into a cylindrical form.

2. A method of expanding elongated fluted metal tubes into cylindrical metal tubes of greater diameter but with the same external surface area and longitudinal length comprising placing said corrugated tube into a cylindrical die having an interior length equal to that of the corrugated tube and having a flat back and flat front plate, sealing movably the ends of said corrugated tube against the flat back plate and flat front plate in fluid-tight relationship and applying high pressure fluid interiorly of said corrugated tube having movably secured ends to expand the entire corrugated tube into a cylindrical form having a longitudinal length equal to that of said corrugated tube.

3. A method in accordance with claim 1 in which the tube end sealing step is effected by a plastic sealing media applied to the flutes and adapted to follow the flutes in their expansion by the high pressure fluid.

4. A method in accordance with claim 2 in which the step of sealing the open ends of the fluted body consists in sealing off said ends by crimping and compressing each of said ends together in sealed condition around a rigid core member disposed within each of said ends.

References Cited in the file of this patent

UNITED STATES PATENTS

| | | |
|---|---|---|
| 167,688 | Puffer | Sept. 14, 1875 |
| 489,950 | Harrington | Jan. 17, 1893 |
| 714,903 | Hinds | Dec. 2, 1902 |
| 1,000,574 | Bauroth | Aug. 15, 1911 |
| 1,177,240 | Gates | Mar. 28, 1916 |
| 1,390,507 | Crawford | Sept. 13, 1921 |
| 1,936,084 | Edwards | Nov. 21, 1933 |
| 2,086,134 | Ludwick | July 6, 1937 |
| 2,172,429 | Yates | Sept. 12, 1939 |
| 2,344,779 | Kolderman | Mar. 21, 1944 |
| 2,350,541 | Stulen et al. | June 6, 1944 |
| 2,399,775 | Whistler | May 7, 1946 |
| 2,400,004 | Jager | May 7, 1946 |
| 2,460,820 | Hagopian | Feb. 8, 1949 |
| 2,467,668 | Hallberg | Apr. 19, 1949 |
| 2,490,695 | Leutheuser | Dec. 6, 1949 |
| 2,503,190 | Branson | Apr. 4, 1950 |
| 2,503,191 | Branson | Apr. 4, 1950 |
| 2,631,640 | Zallea | Mar. 17, 1953 |

FOREIGN PATENTS

| | | |
|---|---|---|
| 542,710 | France | May 20, 1922 |